Nov. 21, 1967  J. E. RIOPELLE  3,353,924
BED REACTOR WITH QUENCH DECK
Filed Jan. 16, 1965

INVENTOR:
JAMES E. RIOPELLE
BY: *Oswald 7d Wilmore*
HIS ATTORNEY

United States Patent Office 3,353,924
Patented Nov. 21, 1967

3,353,924
BED REACTOR WITH QUENCH DECK
James E. Riopelle, Scarsdale, N.Y., assignor to Shell Oil Company, New York, N.Y., a corporation of Delaware
Filed July 16, 1965, Ser. No. 472,571
8 Claims. (Cl. 23—288)

ABSTRACT OF THE DISCLOSURE

Apparatus for mixing a gaseous fluid with a mixed phase feed fluid comprising a gaseous and liquid component prior to contact with a stationary bed of particulate contact material. A closed vessel having a plate with an opening therein is divided into upper and lower chambers. Fluid inlets for the gaseous and mixed phase feed fluids are provided in the upper chamber and the fluids pass through swirl-producing means and the opening in the plate into the lower chamber. Swirl-breaking means stabilizes the swirling fluids prior to the fluids passing onto the bed of particulate material.

---

The invention relates to the mixing of a gas with a mixed phase feed which contains both a liquid component and a gaseous component (the terms "gas" and "gaseous component" being inclusive of vapors). In a particular aspect, the invention relates to the mixing of a cooling, or quench gas, with a mixed phase feed prior to contact with a stationary bed of particulate contact material in a bed reactor. The invention further relates to the distribution of the resultant mixture to the stationary bed after it has been thoroughly mixed.

The mixing of a quench gas with a mixed phase feed and the distribution of the resultant mixture into such beds is encountered, for example, in the hydroprocessing of petroleum fractions. In one such process the particulate bed is composed of catalyst particles, such as silica-alumina coated with cobalt and molybdenum oxide, and the feed stream includes liquid and vaporized hydrocarbon and hydrogen, which is flowed through the bed at elevated pressures, such as 200 to 3,000 lbs. per sq. in., and at elevated temperatures, such as 350–1200° F.

Considering, in particular, the process of hydrocracking, it is an exothermic reaction giving off much more heat than other hydrotreating processes since the bulk of the feed, rather than a minor constituent, is involved. Thus, in hydrocracking it is essential that some cooling means be employed between the successive beds of the reaction to adsorb the excess heat generated by the reaction and, thereby, control the temperature of the process. Hydrogen is one of the elements of the hydrocracking process and is in current use as a quench gas. It is introduced between the beds to mix with the mixed phase feed to cool the same before contact with the next catalyst bed.

Two main requirements for maximum effectiveness of such a quenching means are a rapid and thorough mixing of the quench gas with the mixed phase feed. The methods in common use fail to meet satisfactorily these requirements. It is the purpose of the present invention to provide a method and apparatus to produce a thorough and rapid mixing of the quench gas with the mixed phase feed in such a way that is both effective and economical.

In summary, mixing is effected by bringing a quench gas into intimate contact with a mixed phase feed between beds of a fixed bed reactor. The quench gas is introduced, e.g., via a tubular pipe ring with apertures directed radially inwardly which encircles a circular swirl box surrounded by stationary impeller vanes. As the gas is discharged toward the swirl box from the apertures, it mixes with the mixed phase feed present between beds and the combination is induced into a swirling motion by the vanes and the interior of the swirl box. This effects the mixing of the quench gas and the feed. The mixture escapes from the swirl box via a discharge opening therein, whereupon the swirl is broken up and the mixture separated into liquid and gaseous components for distribution to a lower bed.

The invention will be further described with reference to the accompanying drawings showing certain preferred embodiments wherein.

Figures 1, 2, 3, 4, 5:
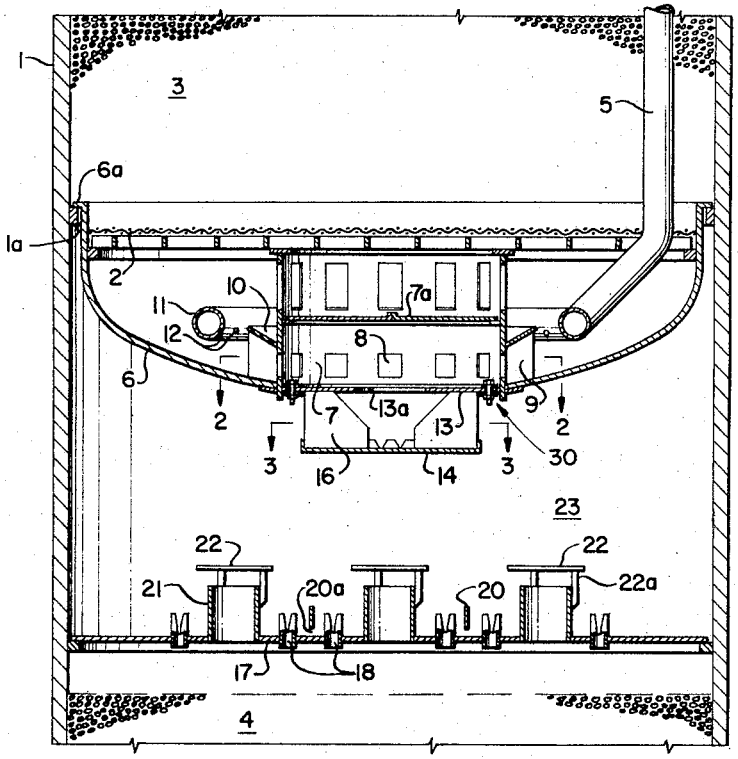
FIGURE 1 is a vertical sectional fragmentary view through a hydroprocessing apparatus according to the invention.
FIGURE 2 is a transverse section on the line 2—2 of FIGURE 1.
FIGURE 3 is a transverse section on the line 3—3 of FIGURE 1.
FIGURE 4 is an enlarged detail sectional view of a liquid downcomer pipe.
FIGURE 5 is an enlarged detail sectional view of the split-clamp ring assembly 30.

Referring to FIGURE 1, the hydroprocessing apparatus, or reactor, comprises a vessel 1, of which only a partial view of the wall is shown, and a plurality of horizontal catalyst screens 2, each supporting a catalyst bed 3 and 4, containing particulate contact material. The mixed phase feed of hot liquid and gas flows down from the bed 3 and is quenched by cool gas supplied by a pipe 5. To effect rapid mixing and quenching of the two hot streams, there is provided a quench deck comprising a transverse plate 6 with an upper-concave surface supporting a swirl box 7, the cylindrical wall of which has inlet ports, or openings 8. Portions of the swirl box 7 are connected to the transverse plate through an overlapping flange arrangement shown in FIGURE 1. The swirl box itself is supported from the plate 6, which in turn is supported by ledge 1a attached to the interior of the reactor wall through a projecting rim 6a of said quench deck. The lower part of the space within this box functions as the swirl chamber and has a cover 7a; this cover comprises two semicircular sections for easy removal. Outside the box is a plurality of stationary, radial fluid-directing, or impeller, vanes 9 (see FIGURE 2) extending vertically from the plate 6 to a frusto-conical plate 10 to provide a vertically converging entrance section. The inner ends of these vanes are tangential to a circle having substantially the diameter of the swirl box and are optionally curved as shown. The pipe 5 leads into a tubular pipe ring 11 encircling the swirl box and having apertures 12 directed radially inwardly toward the passages between the vanes.

This construction with the impeller vanes and swirl box creates a swirling mixture of the downcoming mixed phase feed and the interjected quench gas. This swirling mixture moves downwards from the swirl box 7 through a hole 13a in a plate 13 that covers a larger circular hole in the bottom-center of plate 6. The mixture impinges against a plate 14 having perforations 15 (see FIGURE 3) and supported from the plate 13 by a plurality of, e.g., six vertical baffles 16, which form a stationary vortex breaker. Plate 13 is supported by the swirl box through means of a split-clamp ring assembly 30 (FIGURE 5). A split-clamp ring 13b interconnects plate 13 with a ledge 7b on the swirl box by overlapping the two, said split-clamp ring being held in place by bolts 13c. When these bolts are removed the parts 13, 14 and 16 can be removed upwardly through the swirl box (after the covers 7a are removed). As the swirling mixture of feed and quench gas exits through openings 13a, it is stabilized by the vortex breaker baffles 16 and discharged through the open sides of the vortex breaker and the perforations 15 in plate 14.

The resultant mixture from the swirl box 7 flows into a confined zone 23 and has both liquid and gaseous components. Used in conjunction with the above-described mixing device is a distribution device similar to that disclosed in U.S. Patent No. 3,146,189. The liquid escaping from the vortex breaker drains through said zone 23 onto a distribution plate 17 which has liquid downcomer pipes 18 distributed over its area. FIGURE 4 shows a detail view of one of such liquid downcomer pipes. Each liquid downcomer has a pair of notches 19, preferably widened at the top, to ensure uniform flow rates into the several downcomer pipes from the pool of collected liquid. Liquid calming baffles 20 are mounted on the distribution plate or deck 17 in spaced relation thereto to reduce wave motion that would make the liquid layer on the plate non-uniform. These liquid calming baffles 20 may be arranged as a grid covering the area of the deck 7 and have slots 20a adjacent to the deck through which the liquid can flow for uniform distribution of the liquid over the deck 17. As the liquid level rises on the deck 17, the liquid flows uniformly through the several notches 19 down onto the lower catalyst bed 4.

The gaseous component of the mixture coming from the swirl box 7 flows downwards into the bed 4 through vapor downcomer pipes 21 having spaced covers 22, supported by narrow bands 22a, to prevent entry of liquid. The gas enters the pipes under the covers 22, but the liquid flow is prevented from entering the pipes by the covers. The liquid and gaseous components of the mixture are thereby individually distributed uniformly across the top of bed 4.

Thus, an apparatus is disclosed which provides a means to effect a thorough and rapid mixing of a quench gas with a mixed phase feed between beds of a fixed bed reactor and to distribute the resultant mixture to a lower bed.

I claim as my invention:

1. Apparatus for mixing a gaseous fluid with a mixed phase feed fluid comprising a gaseous and liquid component prior to contact with a stationary bed of particulate contact material which comprises:

a closed vessel;

a transverse plate having an opening therein supported by said vessel and dividing said vessel into an upper and a lower chamber;

mixed phase feed fluid inlet means cooperating with said upper chamber for introducing a mixed phase feed fluid into said upper chamber;

gaseous fluid inlet means cooperating with said upper chamber for introducing a gaseous fluid into said upper chamber;

fluid swirl-producing means positioned above said plate adjacent the opening therein for swirling said fluids and discharging said fluids through said opening and into said lower chamber;

fluid swirl-breaking means positioned below said plate and adjacent said opening therein for stabilizing the swirling fluids exiting from said opening; and a stationary bed of particulate contact material disposed below said swirl-breaking means.

2. In combination with the apparatus defined in claim 1, distribution means located between the swirl-breaking means and the upper surface of the stationary bed for distribution over the area of the bed fluid discharged from said swirl-breaking means said distribution means comprising:

(a) a second transverse plate spaced above the top of the stationary bed to collect said liquid component as a pool;

(b) liquid calming means disposed within said pool for calming said liquid;

(c) uniform liquid distributing means cooperating with said second transverse plate for flowing said liquid component at a uniform rate from said pool downwardly onto the upper surface of the bed as a plurality of liquid streams uniformly distributed over the area of the bed; and (d) uniform gas distributing means cooperating with said second transverse plate for distributing the gaseous component uniformly over the surface of the bed.

3. Apparatus as defined by claim 1 wherein said first-mentioned transverse plate has an upper-concave surface and the opening therein is in the bottom-center thereof.

4. Apparatus as defined in claim 3 wherein said gaseous fluid inlet means includes:

(a) a pipe for bringing the gaseous fluid into the vessel disposed above the upper-concave surface;

(b) a tubular ring having a plurality of apertures through the inner peripheral wall thereof mounted so as to encompass the swirl-producing means and separated therefrom; and (c) connecting means cooperating with said pipe for joining the inlet pipe with the tubular ring.

5. Apparatus as defined by claim 3 wherein said fluid swirl-producing means includes:

(a) a hollow, covered cylindrical swirl box, the wall of which has a plurality of inlet openings radially spaced around its periphery, concentrically mounted upon the plate to enclose the bottom-center opening;

(b) a plurality of stationary impeller vanes extending from the peripheral wall of the swirl box between the inlet openings therein and extending vertically from the upper-concave surface forming passageways leading to said inlet openings; and (c) a frusto-conical plate extending radially outwardly from the peripheral wall of the swirl box and connecting with the top of the impeller vanes to provide a cover for the passageways created between said impeller vanes.

6. Apparatus as defined by claim 1 wherein said swirl-producing means includes:

(a) a hollow, covered cylindrical swirl box with a plurality of inlet openings through the peripheral wall thereof mounted upon the plate to enclose the opening; and (b) a plurality of stationary impeller vanes extending from the peripheral wall of the swirl box between said inlet openings forming passageways leading to said inlet openings.

7. Apparatus for mixing a quench gas with a mixed phase feed comprising a gaseous and liquid component prior to contact with a fixed bed of particulate contact material which comprises:

(a) a fixed bed reactor chamber including a fixed bed of particulate contact material partially filling the reactor chamber, mixed phase feed inlet means above said fixed bed, and outlet means located below said bed;

(b) a transverse plate having an upper-concave surface with a discharge port means in the bottom-center thereof mounted to divide the reactor chamber between the feed inlet means and the fixed bed;

(c) a hollow, covered cylindrical swirl box with a plurality of inlet openings through the peripheral wall thereof concentrically mounted upon the plate to enclose said port means;

(d) a plurality of stationary impeller vanes mounted vertically on the plate surface and extending from the peripheral wall of the swirl box between said inlet openings forming passageways leading to said openings;

(e) a frusto-conical plate supported by the tops of said vanes and connected to the peripheral wall of the swirl box forming a cover for said passageways;

(f) quench gas inlet pipe means for introducing quench gas into said chamber disposed above said transverse plate terminating in a tubular ring having a plurality of apertures through the inner peripheral wall thereof mounted to encompass said swirl-producing means and separated therefrom; and (g) fluid swirl-breaking means connected to the underside of said transverse plate adjacent to the discharge port means for stabilizing swirling fluids exiting from said port means therein.

8. In combination with the apptaratus as defined in claim 7, distribution means located between the swirl-breaking means and the upper surface of the fixed bed which separates at least a predominant portion of the gaseous and liquid components of the resulting fluid mixture and uniformly distributes them across the upper surface of the bed.

References Cited

UNITED STATES PATENTS

| | | | |
|---|---|---|---|
| 2,399,560 | 4/1946 | Murphree | 23—288 |
| 2,632,692 | 3/1953 | Korin et al. | 23—288 |
| 3,235,344 | 2/1966 | Dryer et al. | 208—109 |
| 3,256,065 | 6/1966 | Latham | 23—209.6 |

DELBERT E. GANTZ, *Primary Examiner.*

ABRAHAM RIMENS, *Examiner.*